A. ODENBACH.
WIRE STRETCHER.
APPLICATION FILED SEPT. 8, 1916.
1,218,306.
Patented Mar. 6, 1917.
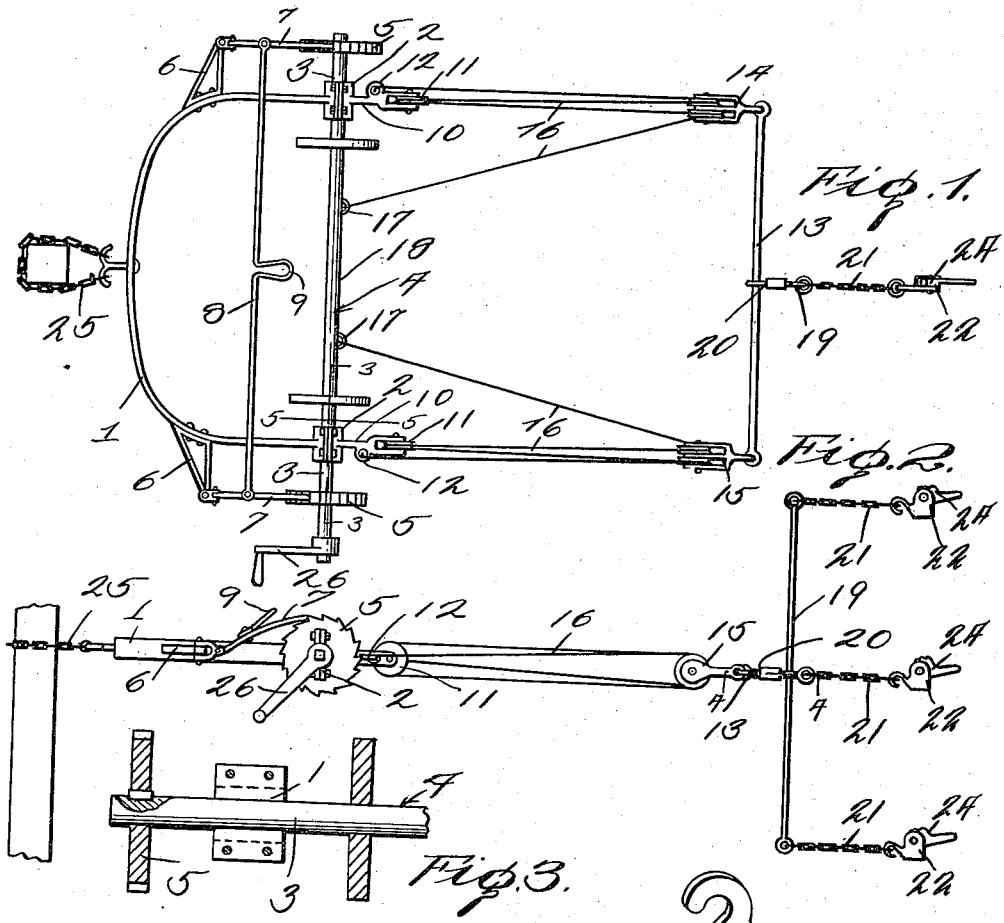
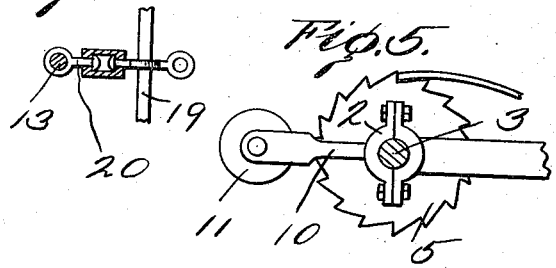
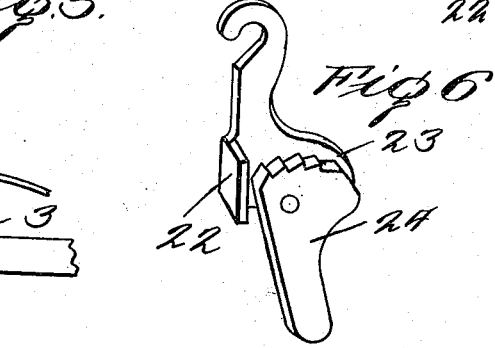
Inventor
A Odenbach
By
Attorneys
Witnesses

UNITED STATES PATENT OFFICE.

ALBERT ODENBACH, OF BONESTEEL, SOUTH DAKOTA.

WIRE-STRETCHER.

1,218,306. Specification of Letters Patent. Patented Mar. 6, 1917.

Application filed September 8, 1916. Serial No. 119,088.

*To all whom it may concern:*

Be it known that I, ALBERT ODENBACH, a citizen of the United States, residing at Bonesteel, in the county of Gregory, State of South Dakota, have invented certain new and useful Improvements in Wire-Stretchers; and I do hereby declare the following to be a full, clear, and exact description of the invention, such as will enable others skilled in the art to which it appertains to make and use the same.

The present invention is directed to improvements in wire stretchers, and has for its object to provide a device of this character constructed in such a manner that it can be conveniently attached to a post and operated to tightly stretch the wire so that the same can be stapled to the post.

A further object of the invention is to provide a device of this character constructed in such a manner that it can be used for stretching single line wires of wire fabric.

With these and other objects in view, this invention resides in the novel features of construction, formation, combination and arrangement of parts to be hereinafter more fully described, claimed and illustrated in the accompanying drawing, in which—

Figure 1 is a top plan view of the device.

Fig. 2 is a side elevation.

Fig. 3 is a sectional view on line 3—3 of Fig. 1.

Fig. 4 is a sectional view on line 4—4 of Fig. 2.

Fig. 5 is a sectional view on line 5—5 of Fig. 1.

Fig. 6 is a detail perspective view of one of the clamps.

Referring to the drawing 1 indicates a yoke, said yoke having boxes 2 carried by the ends of its arms, and journaled in said boxes are the trunnions 3 of the drum 4, said trunnions having their outer ends provided with ratchet wheels 5. Secured to the arms of the yoke 1 are brackets 6, said brackets having pivotally connected thereto pawls 7 which are adapted to engage the ratchet wheels 5 so as to hold the drum against rotary movement in one direction. The pawls 7 are loosely pivoted and are connected by a rod 8 which rests upon the upper surface of the arms of the yoke when engaged with the teeth of the ratchet wheels 5, said rod being provided intermediate its ends with a loop 9 which constitutes a handle whereby the rod can be elevated to cause the pawls to disengage the ratchet wheels when it is desired to unwind the drum.

Supported by the boxes 2 are shanks 10 which support the pulleys 11, and the eyes 12, the purpose of which will appear later.

A bar 13 is provided and has secured to its ends a pair of pulleys 14 and 15 around which are trained the ropes 16, said ropes being also trained around the pulleys 11 and having one of their ends connected to the eyes 12, while their other ends are connected to the loops 17 respectively, which are carried by the drum shaft 18.

A second bar 19 is provided and is swivelly connected to the bar 13 by the pin 20. The bar 19 has connected thereto a plurality of chain sections 21, said chain sections having their outer ends provided with clamps 22, said clamps, comprising plates 23 which have pivotally connected thereto a cam lever 24 which is adapted to clamp the wires when the device is in use.

Connected to the yoke 1 is a chain 25 which is adapted to be passed around a post and secured, after which the drum 4 is rotated, through the medium of the hand crank 26 which is connected to one of the trunnions 3. During the rotation of the drum 4 the ropes 16 will wind thereon, since said ropes are trained around different pulleys it is obvious that as the rope winds on the drum that the bars 13 and 19 will be drawn toward the drum, thus stretching the wires so that they can be stapled to the post.

It will be of course understood that when only one line wire is being stretched that the central clamp 22 will be employed.

What is claimed is:—

A wire stretcher comprising a yoke, a drum engaged with the yoke, shanks carried by the yoke, said shanks having eyes formed therein, pulleys supported by the shanks, a pair of swivelly connected bars, pulleys carried by one of the bars, ropes trained around each of said pulleys and having one of their ends connected to the eyes and their other ends connected with the drum, as and for the purpose set forth.

In testimony whereof, I affix my signature, in the presence of two witnesses.

ALBERT ODENBACH.

Witnesses:
R. J. TAYLOR,
JAKOB WÜST.

Copies of this patent may be obtained for five cents each, by addressing the "Commissioner of Patents, Washington, D. C."